(12) United States Patent
Trenholm et al.

(10) Patent No.: US 11,436,428 B2
(45) Date of Patent: Sep. 6, 2022

(54) SYSTEM AND METHOD FOR INCREASING DATA QUALITY IN A MACHINE LEARNING PROCESS

(71) Applicant: SIGHTLINE INNOVATION INC., Toronto (CA)

(72) Inventors: Wallace Trenholm, Toronto (CA); Mark Alexiuk, Winnipeg (CA); Hieu Dang, Winnipeg (CA); Siavash Malektaji, Winnipeg (CA); Kamal Darchinimaragheh, Winnipeg (CA)

(*) Notice: Subject to any disclaimer, the term of this patent is extended or adjusted under 35 U.S.C. 154(b) by 1036 days.

(21) Appl. No.: 15/997,966

(22) Filed: Jun. 5, 2018

(65) Prior Publication Data

US 2019/0019061 A1 Jan. 17, 2019

Related U.S. Application Data

(60) Provisional application No. 62/515,657, filed on Jun. 6, 2017.

(51) Int. Cl.
| | |
|---|---|
| *G06K 9/62* | (2022.01) |
| *G06N 20/00* | (2019.01) |
| *G06N 20/10* | (2019.01) |
| *G06N 5/02* | (2006.01) |
| *G06N 7/00* | (2006.01) |
| *G06N 3/12* | (2006.01) |

(52) U.S. Cl.
CPC ......... *G06K 9/6218* (2013.01); *G06K 9/6259* (2013.01); *G06K 9/6269* (2013.01); *G06N 20/00* (2019.01); *G06N 20/10* (2019.01); *G06N 3/126* (2013.01); *G06N 5/025* (2013.01); *G06N 7/005* (2013.01)

(58) Field of Classification Search
CPC ..... G06K 9/6218; G06K 9/6259; G06N 20/00
USPC .......................................................... 706/12
See application file for complete search history.

(56) References Cited

U.S. PATENT DOCUMENTS

2018/0322406 A1\* 11/2018 Merrill .................. G06N 20/20

\* cited by examiner

*Primary Examiner* — Jeffery A Williams
(74) *Attorney, Agent, or Firm* — Bhole IP Law; Anil Bhole; Marc Lampert

(57) ABSTRACT

A method and system for increasing data quality of a dataset for semi-supervised machine learning analysis. The method includes: receiving known class label information for a portion of the data in the dataset; receiving clustering parameters from a user; determining a data cleanliness factor, and where the data cleanliness factor is below a predetermined cleanliness threshold: assigning data without class label information as a data point to a cluster using the clustering parameters, each cluster having a cluster class label associated with such cluster; and determining a measure of assignment, and where the measure of assignment for each data point is below a predetermined assignment threshold, receiving a class label for such data points, otherwise, assigning the respective cluster class label to each data point with the respective measure of assignment below the predetermined assignment threshold; and otherwise, outputting the dataset with associated class labels for machine learning analysis.

20 Claims, 7 Drawing Sheets

| Dataset name | Total SKUs | Total Items | Sensor Input | Integrate |
|---|---|---|---|---|
| Dataset 1 | 10 | 1000 | None | Integrate |
| Dataset 2 | 20 | 2000 | Line 1- Cam 3 | Stop |
| Dataset 3 | 20 | 2500 | Line 5- Cam 5 | Stop |
| Dataset 4 | 10 | 3000 | None | Integrate |

FIG. 2C

SYSTEM AND METHOD FOR INCREASING DATA QUALITY IN A MACHINE LEARNING PROCESS

TECHNICAL FIELD

The present disclosure relates to the field of machine learning. More particularly, the present disclosure relates to a method and system for increasing data quality for a machine learning analysis by ground-truthing.

BACKGROUND

Semi-supervised learning is of particular interest in machine learning applications because it can use readily available, unlabeled data to improve supervised learning tasks when labeled data are scarce or expensive. Its use is often initially motivated by its practical value for making learning faster, better, and cheaper. Traditionally, learning has been studied either as unsupervised learning (without any labeled training data) or as supervised learning (with completely labeled training data).

Many machine learning researchers have found that unlabeled data, when used in conjunction with a small amount of labeled data, can produce a considerable improvement in learning accuracy over purely unlabeled data. Acquiring labeled data for a learning problem often requires a skilled human agent or a physical experiment. The costs associated with the labeling process may render a fully labeled training set infeasible, whereas the acquisition of unlabeled data can be relatively inexpensive. Accordingly, semi-supervised learning presents a tool of great practical value.

Data quality is a multi-faceted concept and an important component of machine learning tools. Frequently used terms to describe data quality include accuracy, integrity, completeness, uniqueness, consistency, redundancy, representativity, freshness, and timeliness. Of these terms, data accuracy has the most significant effect on the results and efficiency of machine learning algorithms. The principle of "garbage in, garbage out" applies equally to machine learning as to any other real world problem. High quality input data are fundamental to producing reliable machine learning models and datasets. Regardless of how good the machine learning algorithms are, if the input data used to build and implement the artificial intelligence models is of poor quality (e.g. incomplete, outdated, biased, imbalanced, or inaccurate data), the resulting output or prediction will have little chance of being reliable or useful for subsequent downstream operations.

Accordingly, a system and method for improving the quality of the input data for a machine learning application is desired. The present disclosure seeks to provide such system and method using a semi-supervised learning process.

SUMMARY

The following is intended to be a brief summary of the present disclosure and is not intended to limit the scope of the invention.

In an aspect, there is provided a method for increasing data quality of a dataset for semi-supervised machine learning analysis, the method executed on one or more processors, the method comprising: receiving the dataset for semi-supervised machine learning; receiving known class label information for a portion of the data in the dataset; receiving clustering parameters from a user; determining a data cleanliness factor, and where the data cleanliness factor is below a predetermined cleanliness threshold: assigning data without class label information as a data point to a cluster using the clustering parameters, each cluster having a cluster class label associated with such cluster; and determining a measure of assignment for each data point in each cluster, and where the measure of assignment for each data point is below a predetermined assignment threshold, receiving a class label for such data points, otherwise, assigning the respective cluster class label to each data point with the respective measure of assignment below the predetermined assignment threshold; and otherwise, outputting the dataset with associated class labels for machine learning analysis.

In a particular case, receiving the class label for such data points comprises: predicting the class label for each of such data points; and receiving input from the user, the input comprising a determinization of whether each of the class label predictions were successful, where the prediction was successful, associating the predicted class label with such data point, otherwise, discarding the predicted class label associated with such data point.

In another case, discarding the predicted class label associated with such data point comprises re-assigning the data point as data without class label information to a cluster.

In yet another case, predicting the class label for each of such data points comprises using a prediction function, the prediction function comprising at least one of a smoothness or continuity assumption, a cluster assumption, and a manifold assumption.

In yet another case, predicting the class label for each of such data points comprises at least one of Manifold-Regularized Support Vector Machines and Laplacian Support Vector Machines.

In yet another case, assigning data without class label information as the data point to the cluster comprises: assigning class labels to each of the clusters based on the number of instances of data with class label information in that cluster; for each data point without class label information, determining a probability that such data point is associated with each of the clusters; and associating the class label associated with each cluster to data points without class label information having a greatest probability associated with such cluster.

In yet another case, the clustering parameters comprise at least one of a number of clusters, a confidence threshold, and an expert advice required level.

In yet another case, the data cleanliness factor is received from the user.

In yet another case, the data cleanliness factor is determined by at least one of naive bayes classification, probabilistic networks, rule induction, support vector machines, genetic algorithms, and lazy learning.

In yet another case, the method further comprising, using the machine learning analysis, building a classifier using data with class label information, and, after outputting the dataset with associated class labels, re-building the classifier using the machine learning analysis.

In another aspect, there is provided a system for increasing data quality of a dataset for semi-supervised machine learning analysis, the system comprising one or more processors, a data storage device, an input device for receiving the dataset for semi-supervised machine learning and for receiving input from a user, and an output device, the one or more processors configured to execute: receiving known class label information for a portion of the data in the dataset from the input device; receiving clustering parameters from the user via the input device; determining a data cleanliness factor, and where the data cleanliness factor is below a predetermined cleanliness threshold: assigning data without class label information as a data point to a cluster using the clustering parameters, each cluster having a cluster class label associated with such cluster; and determining a measure of assignment for each data point in each cluster, and where the measure of assignment for each data point is below a predetermined assignment threshold, receiving a class label for such data points, otherwise, assigning the respective cluster class label to each data point with the respective measure of assignment below the predetermined assignment threshold; and otherwise, outputting, by the output device, the dataset with associated class labels for machine learning analysis.

In a particular case, receiving the class label for such data points comprises: predicting the class label for each of such data points; and receiving input from the user, the input comprising a determinization of whether each of the class label predictions were successful, where the prediction was successful, associating the predicted class label with such data point, otherwise, discarding the predicted class label associated with such data point.

In another case, discarding the predicted class label associated with such data point comprises re-assigning the data point as data without class label information to a cluster. In yet another case, predicting the class label for each of such data points comprises using a prediction function, the prediction function comprising at least one of a smoothness or continuity assumption, a cluster assumption, and a manifold assumption.

In yet another case, predicting the class label for each of such data points comprises at least one of Manifold-Regularized Support Vector Machines and Laplacian Support Vector Machines.

In yet another case, assigning data without class label information as the data point to the cluster comprises: assigning class labels to each of the clusters based on the number of instances of data with class label information in that cluster; for each data point without class label information, determining a probability that such data point is associated with each of the clusters; and associating the class label associated with each cluster to data points without class label information having a greatest probability associated with such cluster.

In yet another case, the clustering parameters comprise at least one of a number of clusters, a confidence threshold, and an expert advice required level.

In yet another case, the data cleanliness factor is received from the user.

In yet another case, the data cleanliness factor is determined by at least one of naive bayes classification, probabilistic networks, rule induction, support vector machines, genetic algorithms, and lazy learning.

In yet another case, using the machine learning analysis, the one or more processors is further configured to execute: building a classifier using data with class label information; and, after outputting the dataset with associated class labels, re-building the classifier using the machine learning analysis.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

Preferred embodiments of the present disclosure will now be described, by way of example only, with reference to the attached Figures, wherein:

FIGS. 2A-2E show illustrative user interface screens implemented as part of a ground-truthing system, in accordance with an embodiment.

DETAILED DESCRIPTION OF THE INVENTION

Figure 1:
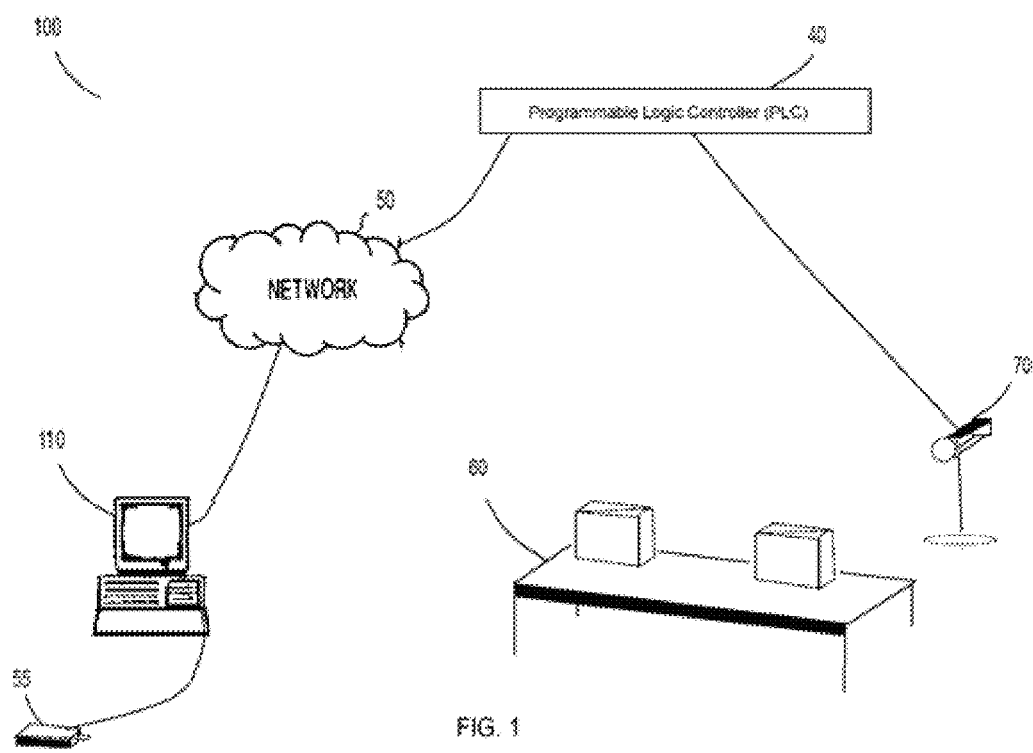
FIG. 1 is a schematic diagram of a ground-truthing system, in accordance with an embodiment.

Before the subject matter of the present disclosure is described in further detail, it is to be understood that the present disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments herein. Also, the description is not to be considered as limiting the scope of the embodiments described herein.

Various terms used throughout the present disclosure may be read and understood as follows, unless the context indicates otherwise: "or" as used throughout is inclusive, as though written and/or; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" and "exemplifying" and not necessarily as "preferred" over other embodiments. Further definitions for terms may be set out herein; these may apply to prior and subsequent instances of those terms, as will be understood from a reading of the present disclosure.

Any module, unit, component, server, computer, terminal, engine, or device exemplified herein that executes instructions may include or otherwise have access to computer readable media such as storage media, computer storage media, or data storage devices (removable and non-removable) such as, for example, magnetic discs, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

One or more systems or methods described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistants, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Embodiments described herein relate to systems and methods for ground-truthing data, and particularly to systems and methods for increasing data quality for a machine learning process by ground-truthing.

Embodiments may apply unsupervised or semi-supervised learning algorithms to develop a clustering and classification system that facilitates cleaning, labeling, or ground-truthing of unlabeled, partially-labeled, or incorrectly labeled data. Embodiments of the present disclosure may include an autonomous data cleaning and labelling system, and may comprise a computer-implemented user interface to receive input from a human operator for ground-truthing data. Ground-truthing can include correctly labeling the data, validating doubtful class labels, or purging invalid data during a cleaning operation or during a training, testing or production run of a neural network. Further embodiments may include conducting ground-truthing locally or remotely on a computer or handheld network capable device by a user, crowd, domain expert or plurality of experts.

A lack of ground-truthed data presents a major challenge in developing classification-based solutions in industries such as manufacturing, healthcare, and others that depend heavily on clean datasets to build reliable and robust artificial intelligence-based classifiers. Ensuring data cleanliness prior to developing a classification-based solution is critical; the use of unclean or "dirty" data can lead to unreliable performance of the classifier generated by the learning process. Often, timely and cost-effective human examination of every data point in a large dataset is not possible. Accordingly, the present disclosure describes a system and method that provides one or more advantages over a strictly human or manual approach by disclosing means to: increase cleanliness of data; assign class labels to previously unlabeled data; and validate class labels assigned by an automated system such as a semi-supervised classifier. Such method and system reduces or limits requirements on human intervention for increasing the cleanliness of data and assigning correct class labels to previously unlabelled data. In some embodiments, the system may issue a request for ground-truthing by an expert when the system fails to automatically perform the above specified operations at an acceptable level.

As used herein, "clean data" refers to datasets having no invalid data points; "dirty data" refers to datasets in which a user has a low confidence level in the correctness of class labels applied to the particular data. Dirty data may include missing data, incorrect data, or a non-standard or non-useful representation of some data. "Dirty" can refer to data that is inaccurate, redundant, duplicate, incomplete, etc. Sources of dirty data may include data acquisition errors, entry errors, update errors, transmission errors, and data processing errors. These errors may be induced by a human or computer system. Before data analysis applications are applied against any data, the data should be cleaned to remove or repair any dirty data. Thus, data cleaning can be considered a process of identifying incomplete, incorrect, inaccurate or irrelevant parts of the data and then replacing, modifying, or deleting such records from a dataset.

In supervised or semi-supervised machine learning, a "class label" comprises a discrete attribute that the machine learning system predicts based on the value of other attributes. A class label takes on a finite (as opposed to infinite) number of mutually exclusive values in a classification problem. The class labels may be predicted based on various input attributes.

While many of the embodiments of the present disclosure refer to the use of a ground-truthing process on "product data", it is to be understood that the application of such ground-truthing systems and methods should not be taken as limited to such product data, and that the ground-truthing systems and methods described herein may be applied to any suitable type of input data on which a user may desire to perform a ground-truthing process.

Embodiments of the present disclosure may implement, use, create, or require access to one or more databases. "Database" as used herein is to be interpreted broadly as referring to any collection of data; the data does not need to be structured in any particular way, or structured at all, and it can be stored on multiple storage devices in one or more locations. A database may, for example, include multiple collections of data, each of which may be organized and accessed differently.

In many machine learning processes, the manual annotation of data by a domain expert is the primary method of obtaining labels for the data. A domain expert may be considered a person who is an authority on the particular topic or area of endeavor to which such data pertains and possesses special knowledge or skills to make a decision or judgement in that specific field (e.g. to determine whether a particular observation falls into a particular class). In some cases, obtaining correct labels (also known as the "ground-truth" or "ground-truthing") for large volumes of data becomes impossible, and the actual data may be estimated from the subjective opinion of a small number of experts or users. Thus, the term "ground-truthing" refers to a process of gathering a correct label for a data item from a user or expert. In semi-supervised learning, a user or expert may also participate in a clustering process where the learning algorithm employs a clustering technique. Accordingly, for the purposes of this disclosure the clustering and ground-truthing steps of the systems and methods described herein or any variation of these steps may be collectively referred to as "ground-truthing."

FIG. 1 shows a schematic diagram illustrating a system 100 for ground-truthing, in accordance with an embodiment. The system 100 includes a computer system 110, which communicates with one or more data input devices, such as external data source 55 and programmable logic controller 40 either directly or via a network 50. While FIG. 1 shows external data source 55 as a USB, any suitable form of external data source is contemplated. In other variations, programmable logic controller 40 may be any other suitable computing device. The components of system 100 can be interconnected by any form or medium of digital data communication, e.g. a communication network (such as network 50). Examples of communication networks include a local area network ("LAN") and a wide area network ("WAN"), e.g., the Internet. Computer system 110 is configured to implement a ground-truthing process on product data for increasing the reliability of a data-driven AI model.

Computer system 110 may be a server computer, desktop computer, notebook computer, tablet, PDA, smartphone, or another computing device. Computer system 110 may include a connection with the internet. In some cases the network 50 may include other types of computer or telecommunications networks. Where appropriate, computer system 110 may include one or more computer systems 110; be unitary or distributed; span multiple locations; span multiple machines; or reside in a cloud, which may include one or more cloud components in one or more networks. Where appropriate, one or more computer systems 110 may perform without substantial spatial or temporal limitation one or more steps of one or more methods described or illustrated herein. As an example and not by way of limitation, one or more computer systems 110 may perform in real time or in batch mode one or more steps of one or more methods described or illustrated herein. One or more computer systems 110 may perform at different times or at different locations one or more steps of one or more methods described or illustrated herein, where appropriate. The computer system 110 can include clients and servers. A client and server are generally remote from each other and typically interact through the communication network 50. The relationship of client and server arises by virtue of computer programs running on the respective computers and having a client-server relationship to each other.

Computer system 110 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer-readable instructions or programs. The applications, computer-readable instructions or programs may be stored in memory or in secondary storage, or may be received from the Internet or other network. Input device may include any device for entering information into computer system 110 or for receiving data from other parts of the system 100 (for example, from memory) or from external data sources. For example, input devices that receive information from a user may be a keyboard, keypad, cursor-control device, touch-screen, camera, or microphone. Display device may include any type of device for presenting visual information. For example, display device may be a computer monitor, a flat-screen display, a projector or a display panel. Output device may include any type of device for providing outputs of the system to the user or to other parts of the system 100 (for example, to memory) or to external data sources. Output device may also include other types of output devices such as speakers, for example. In some cases, computer system 110 may include multiple of any one or more of processors, applications, software modules, second storage devices, network connections, input devices, output devices, and display devices.

Although computer system 110 is described with various components, one skilled in the art will appreciate that computer system 110 may in some cases contain fewer, additional or different components. In addition, although aspects of an implementation of the computer system 110 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the computer system 110 and/or processor to perform a particular method.

In the description that follows, computer system 110 is described performing certain acts. It will be appreciated that computer system 110 may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

Figure 3:
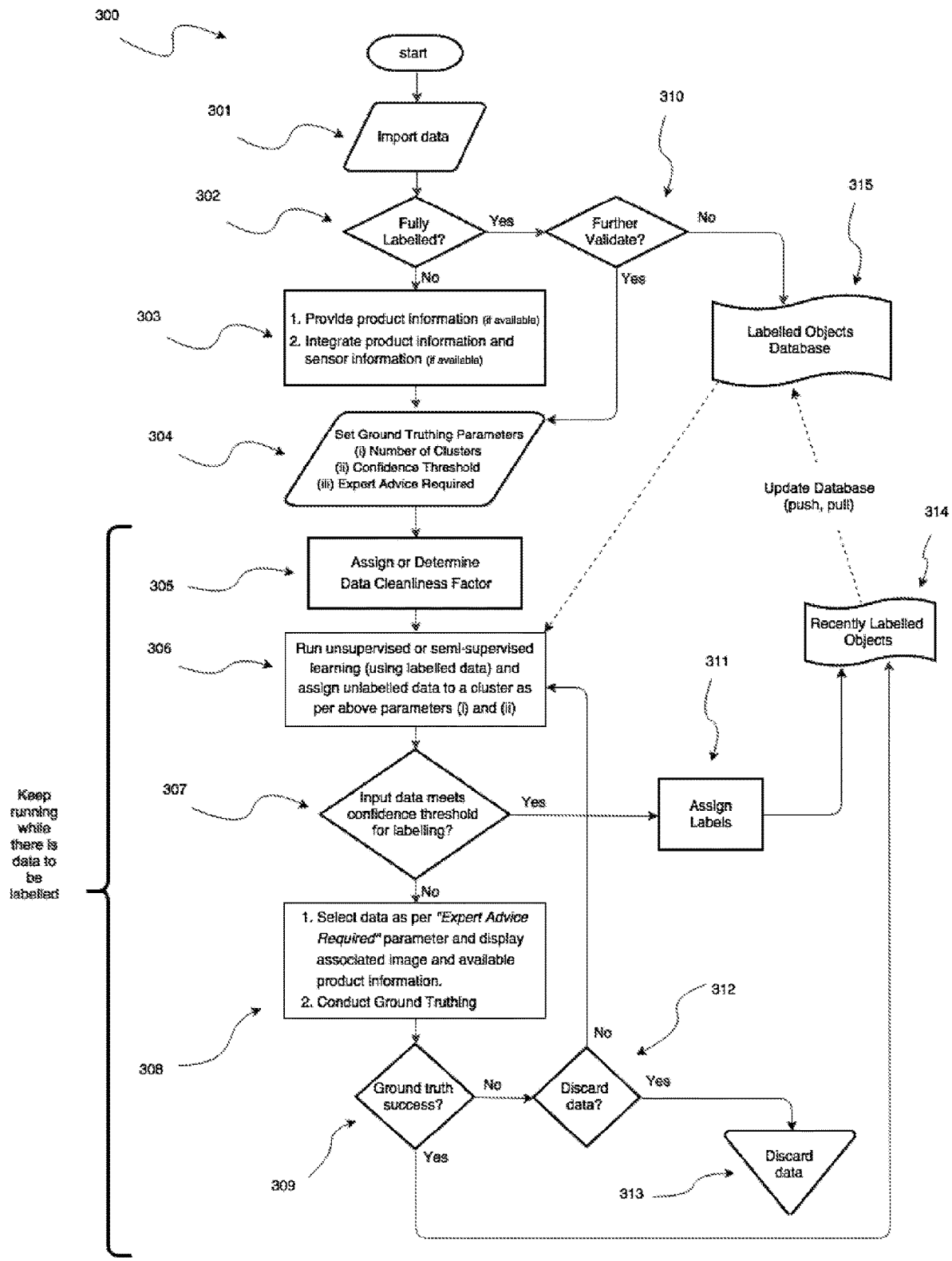
FIG. 3 is a flow diagram depicting a method for ground-truthing, in accordance with an embodiment.

Ground-truthing system 100 of FIG. 1 may be used to perform a ground-truthing process, as described herein, on product data in order to increase data quality for use in a machine learning process. While FIG. 1 refers specifically to product data, it is to be understood that other embodiments are contemplated wherein data as provided by data input devices 55, 40 may comprise any type of data for which a user desires to perform clustering or classification as described herein. Product data may be provided to the computer system 110 from external source 55 or PLC 40. PLC 40 may provide data to computer system 110 in association with an imaging operation. For example, a product 60 can be imaged by a sensor 70 or other device for acquiring data about the product 60. When product data is imported from other systems or devices (e.g., network 50 or USB memory sticks 55) into computer system 110, the cleanliness factor of the product data should be considered and verified via a ground-truthing process. This ground-truthing process (which is also shown in FIG. 3) may include taking data with a low accuracy and assigning a cleanliness factor on a scale of 0 to 100, where 100 indicates that the label for each product in the dataset is correct, and 0 indicates that each product is missing a correct label (missing label, incorrect label, etc.). A negative cleanliness factor can also be assigned to indicate even worse defects than randomly discoverable defects. Using this method and system of ground-truth in semi-supervised learning mode, users can increase the cleanliness of the data.

In an embodiment, computer system 110 may implement a method for unsupervised learning, the method comprising the steps of: loading possible class label information, loading a dataset into computer system 110, clustering, and ground-truthing.

In a further embodiment, the computer system 110 implements a method for semi-supervised learning, the method comprising the steps of: classifying product information, loading dataset to computer system 110, integrating product data, classification, and ground-truthing.

In the embodiment where computer system 110 is configured to implement a semi-supervised learning process, the semi-supervised learning process uses both labeled and unlabeled training data in order to develop a prediction function for classification or clustering purposes. This can involve mixing a small amount of labeled data with a large amount of unlabeled data. Unlabeled data, when used in conjunction with a small amount of labeled data, can produce a considerable improvement in learning accuracy. The class label for unlabeled data can then be predicted by a prediction function generated by the learning process. The prediction function is constructed by assuming some structure to the underlying distribution of the unlabeled and labelled (or ground-truthed) data. These assumptions may include, for example, a smoothness/continuity assumption, a cluster assumption, or a manifold assumption. According to a smoothness/continuity assumption, points in a cluster which are close to each other are more likely to have similar class labels. As per a cluster assumption (which itself represents a special case of a smoothness assumption), data with similar inputs should have similar class labels. As per a manifold assumption, data with similar inputs should have similar outputs. A cluster assumption concerns classification, while the manifold assumption can be applied to tasks other than classification. In one sense, the manifold assumption is a generalization of the cluster assumption.

In an embodiment, the semi-supervised learning process implemented by computer system 110 uses sparsely labeled data supported by a large body of unlabeled data by means of regularization using the unlabeled data manifold (i.e. by estimating the structure of the unlabeled data distribution). Regularization can introduce additional information in order to solve an ill-posed problem or to prevent overfitting. Regularization may improve the generalization of a model learned by the computer system 110. When guided by a manifold estimation, classification boundaries can be effectively and robustly estimated from a few labeled samples.

A user only needs to label a small set of data points from a large, unlabeled data pool. The labels of the remaining unlabelled points can be determined automatically through the semi-supervised learning process. The semi-supervised learning process may implement one or more semi-supervised algorithms including, without limitation, Manifold-Regularized Support Vector Machine or Laplacian Support Vector Machines. Other algorithms may include generative models, self-training, co-training, transductive support vector machines, and graph-based methods or any variation thereof. Self-training represents a typical semi-supervised classification algorithm due to its efficiency and simplicity. In the self-training approach, a classifier is first trained with labeled data. The trained classifier is then applied to the unlabeled data to predict their labels. The unlabeled instances with high confidence can be labeled and added to the training set, and the process repeated until convergence. Generative models can also be used, particularly where clustering algorithms are employed. Such algorithm learns a supervised predictor from labeled instances in each cluster and applies the predictor to all unlabeled instances in each cluster. This approach can also be considered "cluster-and-label".

Alternatively, a spectral clustering-based approach may be used. A spectral clustering-based approach may be based on the self-training model and cluster assumption, using spectral clustering and a classifier to: (i) partition all labeled and unlabeled data into clusters; (ii) build a classifier using labeled data; (iii) determine the probability of class labels that each unlabeled instance belongs to, for each cluster; (iv) assign class labels to clusters based on the number of instances of labeled data in that cluster; (v) select unlabeled instances with high-confidence in above labeled clusters and extend the class label to such instances; and (vi) re-build that classifier as in step (ii) and repeat the above process until there are no longer unlabeled instances. Spectral clustering reformulates the clustering using a graph having edges denoting similarities between data points.

Where a cluster analysis is used, the data set is partitioned into homogeneous subgroups. As conventional clustering methods are unsupervised, there is no outcome variable and the relationship between observations in the data set is unknown. However, information about the clusters may be indirectly available; for example, if the labels of some observations are known, a user may want to identify the associated clusters with the same classes of those observations. Thus, a cluster concept can also be used in a semi-supervised process. In a further embodiment implementing semi-supervised clustering, the labeled observations can serve as "seed" for growing the clusters. The concept of clustering is represented in FIG. 2D. The clustering step may present a user with a visual representation of data classification.

Referring now to FIGS. 2A-2E, shown therein are illustrative user interface screens illustrating how operators of the systems described herein can carry out the functionality of those systems. In an embodiment, a ground-truthing method is implemented as part of a computer software having a plurality of tabs. The plurality of tabs, as shown in FIGS. 2A-E, comprise a metaset step 10, a dataset step 11, an integration step 12, a clustering step 13, and a ground-truthing step 14.

Figure 2A:
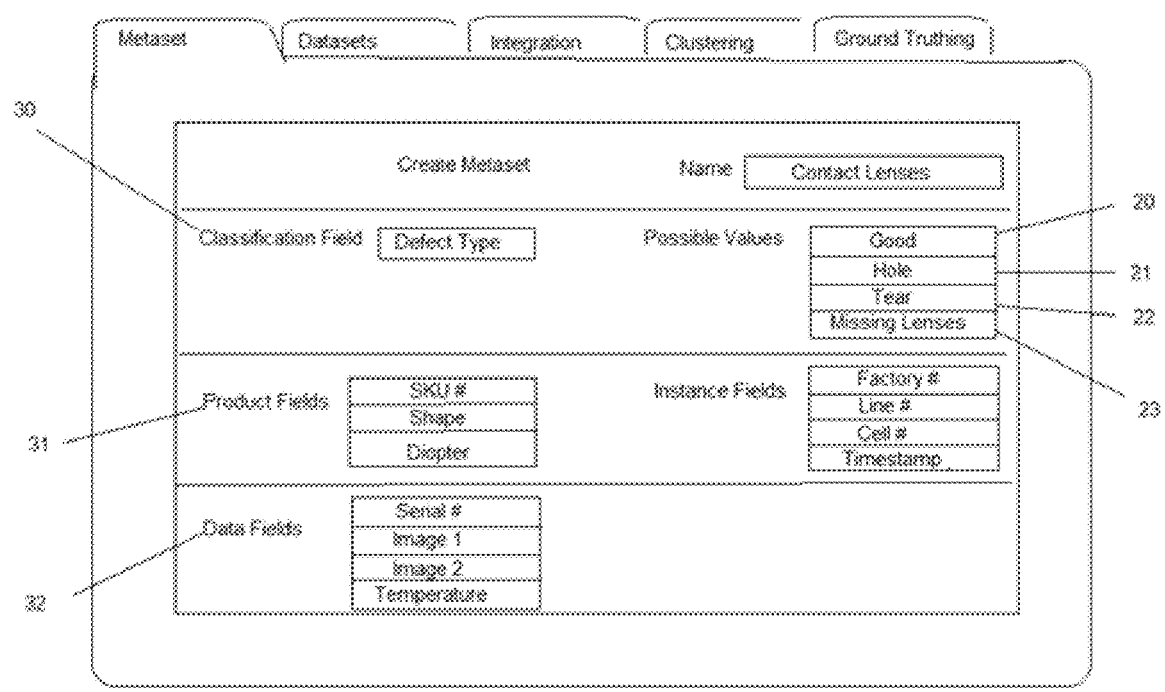

Metaset step 10 is shown in tab form in FIG. 2A. The tab includes one or more metadata fields to capture information about the individual items in partly-labeled data. The metadata fields include a Classification Field 30 (having an assignable value or class, such as values/classes 20-23), a Product Field, an Instance Field 31, and a Data Field 32. The Classification Field 30 provides a plurality of classes, as shown. In a product quality control application using contact lens data, each class can represent a defect type with possible values such as good, hole, tear, missing lens, etc. While FIG. 2A comprises one class of data, other embodiments may comprise multiple classes of data with multiple levels of subclasses. In an embodiment, the ground-truthing system may be configured to label multiple classes and subclasses at once. For example, in a product quality control inspection application, the Product Field can include information such as SKU #, Shape, and Diopter, while the Instance Field can include Factory #, Line #, Cell # and Timestamp, and the Data Field can include information such as Serial #, an image of the product, and temperature. In some variations, the Metaset tab 10 may include metafields to capture information about the data to be ground-truthed.

Figure 2B:
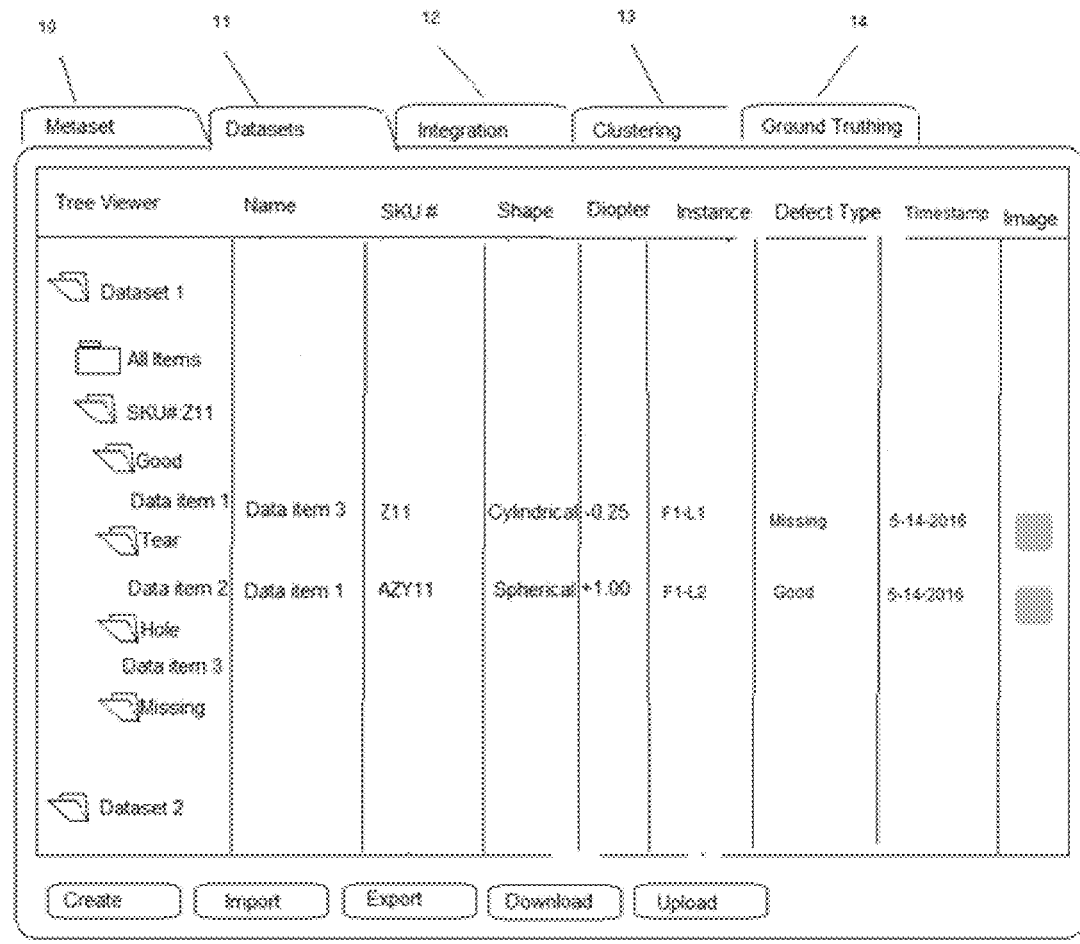
Figure 2D:
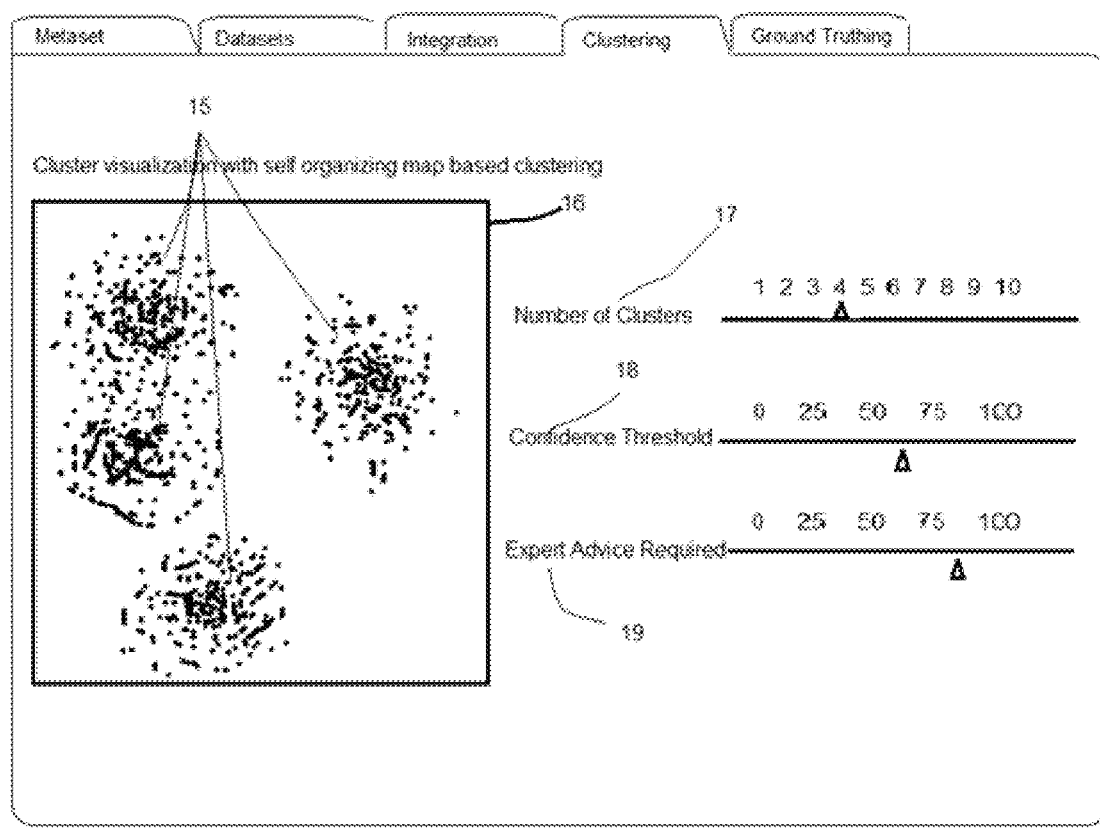

Dataset step 11 is shown in tab form in FIG. 2B. The tab may comprise a visual interface for displaying and allowing the user to interact with the contents of a data container that has been loaded with data. Data may be displayed in tab 11 in a tabular format, for example having metafields 30, 31, 32, from metadata step 10 parsed into columns. The tab 11 may be used to manage individual or multiple data items or to manage dataset folders. At dataset step 11, operations such as import, export, download, or upload of data may be selected by the user and performed by the computer system 110. A user can perform operations such as copy, paste, move, view, edit, delete, etc. on individual or multiple data items or dataset folders.

In an embodiment, to prevent or reduce the likelihood of imbalanced classification, the ground-truthing system 100 can be provided with only balanced datasets. Imbalanced classification is a supervised learning problem where one class outnumbers another class by a large proportion. Imbalanced classification arises more frequently in binary classification problems than multi-level classification problems. Imbalanced data can occur where classes are not represented equally. While most classification datasets do not have an equal number of instances in each class, small differences are often insignificant. With imbalanced datasets, the machine learning algorithm doesn't get the necessary information about the minority class to make an accurate prediction of the data class, which can cause a bias in the performance of classifiers towards a majority class.

When aggregating training data for training a classifier, the rate at which data is acquired may not be the same for all classes. As a result, datasets for a first class may reach a required sample size in a very short period of time, whereas data acquisition for a second class may have to continue for a longer duration to reach the same sample size. The dataset for the first class and dataset for the second class may then be integrated to create a balanced master dataset.

Integration step 12 is shown in tab form in FIG. 2C. At integration step 12, product data from the dataset step 11 and sensor information 35 (e.g. from sensor 70 or other sensor device for acquiring data from product 60) can be displayed and integrated. Multiple datasets are integrated together to form a larger dataset comprising a relatively even distribution of class labels. This may improve accuracy of classifiers and prevent overfitting of a classifier to a given class due to imbalanced classes in the training set. In an embodiment comprising multiple datasets from dataset step 11, the datasets can be static or dynamic. Static datasets are not connected to a sensor, while dynamic datasets may be acquired via a live data acquisition operation such as in a production environment. In FIG. 2C, Dataset 1 and Dataset 4 are static datasets, while Dataset 2 and Dataset 3 are dynamic and may grow over time as live data acquisition continues. Data acquisition can be stopped when the size of Datasets 2 and 3 match some predetermined criteria.

Clustering step 13 is shown in tab form in FIG. 2D. Partially labelled data may be clustered into a certain number of clusters, according to a clustering technique. Clustering of partially labelled data may take the form of a plot 15 in one, two or three dimensions. Clustered data can be plotted after applying one or more dimension reduction techniques such as feature selection, feature extraction or feature engineering to reduce the number of random variables under consideration and to obtain a set of principal variables. A feature selection approach may try to find a subset of the existing features by using strategies such as filtering (e.g. information gain), wrapper (e.g. search guided by accuracy) approaches, and embedded approaches (features are selected to add or be removed while building the model based on the prediction errors). Feature extraction techniques may transform existing features into a lower-dimensional space. This data transformation can be linear (e.g. principal component analysis, singular value decomposition, factor analysis, canonical variate analysis, etc.) or nonlinear (e.g. manifold learning). Feature engineering may transform data from a multi-dimensional feature space by pre-processing, combining, etc. to produce data that is more meaningful but has a lower dimensional feature space.

A user can control various parameters of the clustering step 13, such as the number of clusters 17, a confidence threshold 18 (i.e. the threshold of measure of assignment of an input sample to a given cluster), or expert advice required level 19. In an embodiment, clustering step 13 generates a "live" cluster plot that can be displayed to the user. Clustering may be requested on demand according to parameters 17,18.

In an embodiment, the clustering step 13 displays data that has already been processed in all possible combinations of number of clusters 17 and confidence thresholds 18. In such scenario, the Clustering step 13 can provide the user with a visualization interface to filter which images are to be ground-truthed by adjusting one or more of parameters 17, 18, and 19.

In variations, the confidence threshold 18 may be adjusted for each cluster, rather than as a global parameter applied to all clusters.

Where input data comprises imaging data (for example from images of products 60), such data may contain no information beyond that present in the pixels themselves. Semi-supervised learning methods may rely on the density structure of the data itself to propagate known labels to areas of the data lacking annotations, and may represent one way of creating labeling uncertainty. Determining a dataset distribution according to a semi-supervised learning technique can be based on a smoothness, cluster or manifold assumption. According to these assumptions, classification points 15 that are close to each other in a cluster have very similar characteristics. In the embodiment relating to optical lens product data, each class label (Good 20, Tear 21, Hole 22, Missing 23) may show close distance on a 2D plane 16. The number of clusters 17 can be adjusted to match the number of labels in the dataset being clustered. However, clusters displayed on the 2D plane 16 do not necessarily represent each label uniquely. There may be feature overlap such that class labels cannot be distinctly separated. Such class labels may be incorrectly included together in a cluster, resulting in multiple class labels in one cluster. In other instances, outlier data points from a given class label may form a cluster of their own, resulting in multiple clusters for one class label.

Ideally, all data points are ground-truthed to achieve perfect accuracy. However, only a few data points may need to be ground-truthed to confidently label a large number of data points. At clustering step 12, the user can select the data points to be ground-truthed by using confidence threshold 18. For example, if a user chooses five classifications, they can ground-truth the five most important data points, which are usually located in the center of the clusters. In a semi-supervised learning system, properly distributing 5% of class labels to data points, for example, may facilitate labelling all other data points around the labelled points because of their distance and membership inside the cluster in high-dimensional space. By adjusting the confidence threshold 18, data in a given cluster may be segmented into (i) data that can be labelled automatically by the system based on the ground-truthed data, and (ii) data that should be ground-truthed by an expert.

By controlling the expert advice required level 19, the user can customize the amount of data ground-truthed by the expert and, correspondingly, the amount of data ground-truthed by the user. For example, setting the expert advice required level 19 to 80 presents 20% of the data to the user for ground-truthing, and 80% of the data to the expert for ground-truthing. Thus, in variations the expert as well as the user can perform ground-truths on the data. By increasing the expert advice required level 19, the user may increase the quality of labeling; this is assuming that the expert is, in fact, better than a non-expert user at performing ground-truths. By controlling the confidence threshold 18, the user can decide who will perform the ground-truthing of data based on the level of resources available.

Figure 2E:
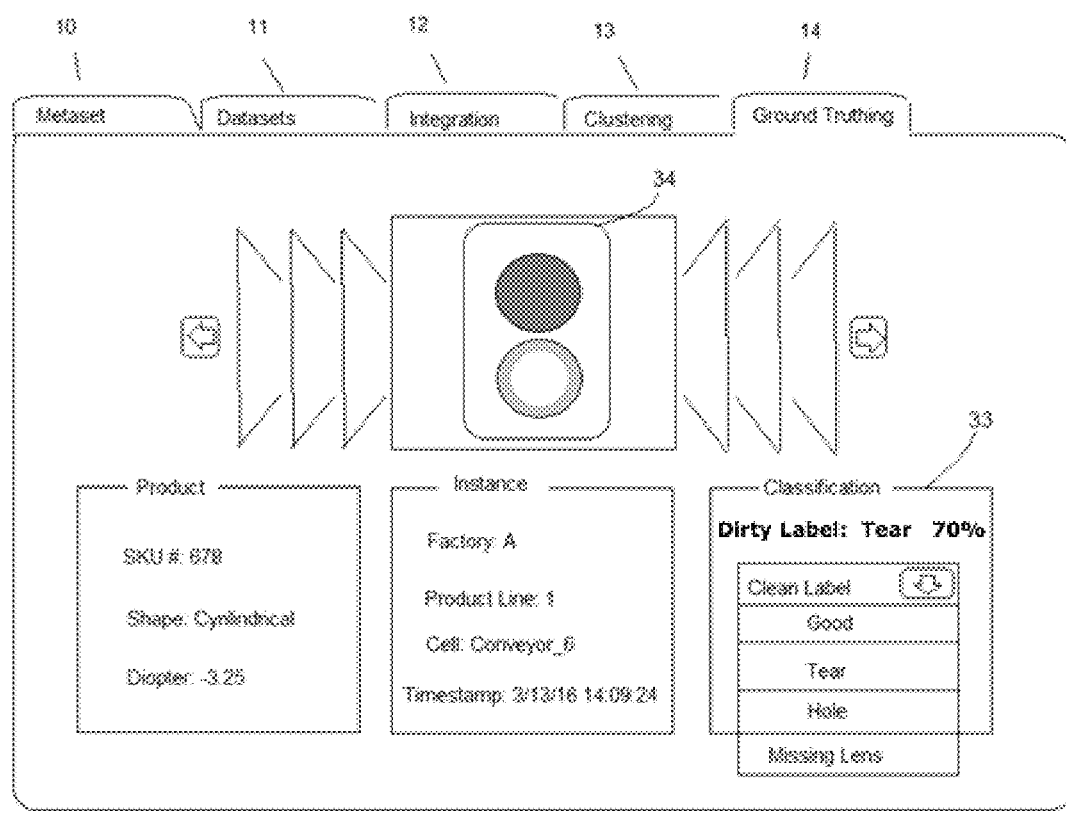

Ground-truthing step 14 is shown in tab form in FIG. 2E. An image of a product 34 and related information, such as the product and instance, as well as a classification label 33 are provided to the expert or user. The classification label 33 comprises one of multiple classes predicted by a pre-ground-truthing classifier as part of a classification operation, with each class having one or more levels of subclasses. As part of the ground-truthing step 14, classification 33 may include an accuracy level of the class label for the item being ground-truthed. Each classification operation may generate a class label output for the given input data via the pre-ground-truthing classifier. For example, in the optical lens product data case, the pre-ground-truthing classifier predicts a defect-type class label such as "good", "tear", "hole", or "missing". The expert or user can validate the class label as predicted by the pre-ground-truthing classifier or the they can update the class label for the given input data to a different or a totally new class label as per their judgement. Such corrected input data (i.e. the set of information about product defects provided by the user) may be updated in the datasets of the dataset step 11, while the rest of the data may also be similarly updated by a semi-supervised learning process, thereby increasing the overall accuracy of the datasets.

In an embodiment, the ground-truthing step 14 can be used by itself during training, testing or production stages of a neural network. Ground-truthing step 14 may be implemented and accessed locally on a computer, tablet or a mobile device, or remotely in real-time or near-real-time to ground-truth in order to validate or override output. If a probabilistic output meets a certain threshold or if input data based on object images is misclassified as false positive or false negative, a corresponding object image of the object can be provided to the expert (e.g. displayed on expert's device) for ground-truthing. Depending on the type of application, the object image can be sent to one expert, to several experts, or to a "crowd". Final feedback, whether comprising validation or override, may be determined by a weighted measure of feedback from the expert(s), particularly where there is no clear consensus among experts.

In this respect, "meets" a certain threshold can be taken to mean either falling below a certain threshold or exceeding a certain threshold, depending upon the threshold set. As is described herein, the set threshold is applied to a comparison operator, and the operator depends on the criteria/metric used for assignment. For example, if the threshold is a mean squared error/distance, then measure of assignment should be below the threshold, but if the criteria is similarity/confidence, then the measure of assignment should exceed the threshold. In the embodiments described herein, the term "meets" in respect of the threshold is explained with reference to an example where the measure of assignment should be below the threshold.

Referring now to FIG. 3, shown therein is a flow diagram depicting a method 300 for ground-truthing to clean dirty data or to validate an output of a classifier, in accordance with an embodiment. Ground-truthing method 300 may be implemented on a computer system, such as computer system 110 of FIG. 1. At 301, data is imported into computer system 110. At 302, the imported data is checked for labelling (i.e. to see if the data is fully labelled or not). If the data is not fully labelled, at 303 the user can provide metadata about the imported data. If the data is fully labelled, at 310 the user selects whether or not to further validate the labelling accuracy of the fully labelled data. If the user selects not to validate the fully labelled data, the data may be added to a labelled objects database (LOD) at 315. The LOD comprises a database of ground-truthed objects or fully-labelled objects that meet a particular desired standard (e.g. a "gold" standard). The LOD may be used for training and/or testing phases of a supervised learning process. If, at 310, the user selects to further validate the data, the user is presented with a clustering interface. At 304, the user selects parameters for the clustering process, such as the number of clusters, confidence threshold, and expert advice required level. At 305, the user can assign a data cleanliness factor for the data, or apply one or more machine learning techniques (e.g. naive bayes classification, probabilistic networks, rule induction, support vector machines, genetic algorithms, and lazy learning techniques) to the data in order to determine the data cleanliness factor.

In an embodiment, step 305 comprises the start of a ground-truthing loop where, as long as the cleanliness factor is below a certain threshold or unlabelled data is present, the ground-truthing process continues until data is successfully ground-truthed (as may be determined at 309), or the process is manually interrupted.

At step 306, the ground-truthing system processes unlabelled or partially labelled data and fits the data into clusters according to a clustering technique in accordance with parameters set at 304. The ground-truthing system may employ supervised and/or unsupervised machine learning techniques at 306 to assign unlabelled or partially labelled data points to a cluster. For a supervised learning process, a classifier implemented at 306 uses data from the LOD (of 315). For each data point in a cluster, a measure of assignment of each data point to that cluster is computed. At 307, the measure of assignment for a data point in a given cluster is evaluated against the confidence threshold for labelling established at 304. If the confidence threshold is met, the data point is assigned to the same class label as the cluster at 311. Data assigned labels at 311 may be stored in a pool of Recently Labelled Objects (RLO) at 314.

If at 307 the measure of assignment for a data point in a given cluster does not meet the confidence threshold it is presented to an expert for ground-truthing at 308, subject to the expert-advice-required parameter established at 304. An associated image and product information may be displayed at this stage. At 309, the success of the ground-truthing is evaluated by an expert. If the expert determines ground-truthing was successful, the successfully ground-truthed data is assigned the appropriate class label, updated, and stored in the pool of RLO at 314. If, at 309, the expert determines the ground-truthing was not successful, the expert may decide at 312 whether or not to discard the unsuccessfully ground-truthed data. If the expert chooses not to discard, the data is sent back to the dirty data pool at which point it may be presented to another expert or to the learning model at 306 as the accuracy and cleanliness of the data increases. Otherwise, the expert may choose to discard the data if he or she is confident that the data is corrupt or completely irrelevant to the problem being addressed. For example, if a user or an expert is presented with an image of an apple when the purpose is to develop a system to determine the make and model of cars, the image can be discarded at 313 as it is irrelevant data which cannot be assigned a label reserved for car make or model. If the expert selects to discard the data, at 313 the selected data may be tagged as discarded and purged.

The pool of RLO at 314 may comprise a data container for temporarily storing recently labelled objects before they are merged with the LOD from 315. The "recency" of the objects in the RLO container may be determined by factors such as number of elapsed sessions, number of events, or by passage of time. A data transfer from the pool of RLO to the LOD may occur via a push mechanism or pull mechanism. In a push mechanism, the data is forcefully sent by RLO to update LOD. The data may be pushed by RLO automatically every time there is a new entry in RLO, RLO can push data to LOD according to a certain schedule, or RLO can push data to LOD if certain conditions are met. In a pull mechanism, LOD may be updated on-demand upon request from LOD every time there is a new entry in RLO, LOD can pull data from RLO according to a certain schedule, or LOD can pull data from RLO if certain conditions are met.

The term "classifier" as used herein means any algorithm, or mathematical function implemented by a classification algorithm, that implements a classification process by mapping input data to a category. The term "classification" as used herein should be understood in a larger context than simply to denote supervised learning. By classification process we convey: supervised learning, unsupervised learning, semi-supervised learning, active/groundtruther learning, reinforcement learning and anomaly detection. Classification may be multi-valued and probabilistic in that several class labels may be identified as a decision result; each of these responses may be associated with an accuracy confidence level. Such multi-valued outputs may result from the use of ensembles of same or different types of machine learning algorithms trained on different subsets of training data samples. There are various ways to aggregate the class label outputs from an ensemble of classifiers; majority voting is one method.

The above described embodiments of the present disclosure are intended to be examples of the present disclosure and alterations and modifications may be effected thereto, by those of skill in the art, without departing from the scope of the present disclosure, which is defined solely by the claims appended hereto. For example, systems, methods, and embodiments discussed can be varied and combined, in full or in part.

Thus, specific systems and methods for increasing data quality for a machine learning process by ground-truthing have been disclosed. It should be apparent, however, to those skilled in the art that many more modifications besides those already described are possible without departing from the inventive concepts herein. The subject matter of the present disclosure, therefore, is not to be restricted except in the spirit of the disclosure. Moreover, in interpreting the present disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A method for increasing data quality of a dataset for semi-supervised machine learning analysis, the method executed on one or more processors, the method comprising:
   receiving the dataset for semi-supervised machine learning;
   receiving known class label information for a portion of the data in the dataset;
   receiving clustering parameters from a user;
   determining a data cleanliness factor, the data cleanliness factor comprising a scaled measure of corruption or irrelevancy to the machine learning problem, and where the data cleanliness factor is below a predetermined cleanliness threshold:
      assigning data without class label information as a data point to a cluster using the clustering parameters, each cluster having a cluster class label associated with such cluster; and
      determining a measure of assignment for each data point in each cluster, the measure of assignment comprising a confidence of assignment of an input sample in the dataset to the associated cluster, and where the measure of assignment for each data point is below a predetermined assignment threshold, receiving a class label for such data points, otherwise, assigning the respective cluster class label to each data point with the respective measure of assignment below the predetermined assignment threshold; and
   otherwise, outputting the dataset with associated class labels for machine learning analysis.

2. The method of claim 1, wherein receiving the class label for such data points comprises:
   predicting the class label for each of such data points; and
   receiving input from the user, the input comprising a determinization of whether each of the class label predictions were successful, where the prediction was successful, associating the predicted class label with such data point, otherwise, discarding the predicted class label associated with such data point.

3. The method of claim 2, wherein discarding the predicted class label associated with such data point comprises re-assigning the data point as data without class label information to a cluster.

4. The method of claim 2, wherein predicting the class label for each of such data points comprises using a prediction function, the prediction function comprising at least one of a smoothness or continuity assumption, a cluster assumption, and a manifold assumption.

5. The method of claim 2, wherein predicting the class label for each of such data points comprises at least one of Manifold-Regularized Support Vector Machines and Laplacian Support Vector Machines.

6. The method of claim 1, wherein assigning data without class label information as the data point to the cluster comprises:
 assigning class labels to each of the clusters based on the number of instances of data with class label information in that cluster;
 for each data point without class label information, determining a probability that such data point is associated with each of the clusters; and
 associating the class label associated with each cluster to data points without class label information having a greatest probability associated with such cluster.

7. The method of claim 1, wherein the clustering parameters comprise at least one of a number of clusters, a confidence threshold, and an expert advice required level.

8. The method of claim 1, wherein the data cleanliness factor is received from the user.

9. The method of claim 1, wherein the data cleanliness factor is determined by at least one of naive bayes classification, probabilistic networks, rule induction, support vector machines, genetic algorithms, and lazy learning.

10. The method of claim 1, further comprising, using the machine learning analysis, building a classifier using data with class label information, and, after outputting the dataset with associated class labels, re-building the classifier using the machine learning analysis.

11. A system for increasing data quality of a dataset for semi-supervised machine learning analysis, the system comprising one or more processors, a data storage device, an input device for receiving the dataset for semi-supervised machine learning and for receiving input from a user, and an output device, the one or more processors configured to execute:
 receiving known class label information for a portion of the data in the dataset from the input device;
 receiving clustering parameters from the user via the input device;
 determining a data cleanliness factor, the data cleanliness factor comprising a scaled measure of corruption or irrelevancy to the machine learning problem, and where the data cleanliness factor is below a predetermined cleanliness threshold:
  assigning data without class label information as a data point to a cluster using the clustering parameters, each cluster having a cluster class label associated with such cluster; and
  determining a measure of assignment for each data point in each cluster, the measure of assignment comprising a confidence of assignment of an input sample in the dataset to the associated cluster, and where the measure of assignment for each data point is below a predetermined assignment threshold, receiving a class label for such data points, otherwise, assigning the respective cluster class label to each data point with the respective measure of assignment below the predetermined assignment threshold; and
 otherwise, outputting, by the output device, the dataset with associated class labels for machine learning analysis.

12. The system of claim 11, wherein receiving the class label for such data points comprises:
 predicting the class label for each of such data points; and
 receiving input from the user, the input comprising a determinization of whether each of the class label predictions were successful, where the prediction was successful, associating the predicted class label with such data point, otherwise, discarding the predicted class label associated with such data point.

13. The system of claim 12, wherein discarding the predicted class label associated with such data point comprises re-assigning the data point as data without class label information to a cluster.

14. The system of claim 12, wherein predicting the class label for each of such data points comprises using a prediction function, the prediction function comprising at least one of a smoothness or continuity assumption, a cluster assumption, and a manifold assumption.

15. The system of claim 12, wherein predicting the class label for each of such data points comprises at least one of Manifold-Regularized Support Vector Machines and Laplacian Support Vector Machines.

16. The system of claim 11, wherein assigning data without class label information as the data point to the cluster comprises:
 assigning class labels to each of the clusters based on the number of instances of data with class label information in that cluster;
 for each data point without class label information, determining a probability that such data point is associated with each of the clusters; and
 associating the class label associated with each cluster to data points without class label information having a greatest probability associated with such cluster.

17. The system of claim 11, wherein the clustering parameters comprise at least one of a number of clusters, a confidence threshold, and an expert advice required level.

18. The system of claim 11, wherein the data cleanliness factor is received from the user.

19. The system of claim 11, wherein the data cleanliness factor is determined by at least one of naive bayes classification, probabilistic networks, rule induction, support vector machines, genetic algorithms, and lazy learning.

20. The system of claim 11, wherein, using the machine learning analysis, the one or more processors is further configured to execute: building a classifier using data with class label information; and, after outputting the dataset with associated class labels, re-building the classifier using the machine learning analysis.

* * * * *